United States Patent
Marelli et al.

(10) Patent No.: US 10,153,962 B2
(45) Date of Patent: Dec. 11, 2018

(54) GENERATING HIGH-SPEED TEST TRAFFIC IN A NETWORK SWITCH

(71) Applicant: Mellanox Technologies TLV Ltd., Raanana (IL)

(72) Inventors: Amiad Marelli, Herzliya (IL); George Elias, Tel Aviv (IL); Itamar Rabenstein, Petah Tikva (IL); Miriam Menes, Tel Aviv (IL); Ido Bukspan, Herzliya (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 162 days.

(21) Appl. No.: 15/186,557

(22) Filed: Jun. 20, 2016

(65) Prior Publication Data

US 2017/0366442 A1    Dec. 21, 2017

(51) Int. Cl.
*H04L 12/26* (2006.01)
*H04L 12/947* (2013.01)
*H04L 12/18* (2006.01)

(52) U.S. Cl.
CPC ............. *H04L 43/50* (2013.01); *H04L 49/25* (2013.01); *H04L 12/1854* (2013.01); *H04L 43/106* (2013.01)

(58) Field of Classification Search
CPC ..................................................... H04L 43/50
USPC ......................................................... 370/250
See application file for complete search history.

(56) References Cited

U.S. PATENT DOCUMENTS

| 6,542,502 B1* | 4/2003 | Herring ............... H04L 45/40 370/390 |
| 7,751,421 B2 | 7/2010 | Chi et al. |
| 2004/0095890 A1 | 5/2004 | Wang et al. |
| 2013/0250762 A1 | 9/2013 | Assarpour |
| 2013/0294255 A1* | 11/2013 | Olgaard ............... H04W 48/06 370/242 |
| 2016/0337258 A1* | 11/2016 | Attar ................... H04L 49/3036 |

OTHER PUBLICATIONS

Roitshtein et al., U.S. Appl. No. 14/961,923, filed Dec. 8, 2015.

* cited by examiner

*Primary Examiner* — Shripal K Khajuria
(74) *Attorney, Agent, or Firm* — D.Kligler IP Services Ltd.

(57) ABSTRACT

Communication apparatus includes multiple interfaces connected to a packet data network, and a memory coupled to the interfaces and configured as a buffer to contain packets received through ingress interfaces while awaiting transmission to the network via respective egress interfaces. Packet processing logic is configured, upon receipt of a test packet through an ingress interface of the apparatus, to allocate a space in the buffer for storage of a single copy of the test packet, to replicate and transmit sequentially multiple copies of the stored copy of the test packet through a designated egress interface, to receive an indication of a number of copies of the test packet that are to be transmitted, and responsively to the indication, to terminate replication of the test packet and release the allocated space in the buffer.

18 Claims, 4 Drawing Sheets

GENERATING HIGH-SPEED TEST TRAFFIC IN A NETWORK SWITCH

FIELD OF THE INVENTION

The present invention relates generally to packet communication networks, and particularly to methods and apparatus for testing such networks.

BACKGROUND

A common practice in testing the capabilities and performance of a packet data network is to inject a high-speed stream of packets into the network and monitor how well the network forwards and handles the packets. Ideally, a network should be able to handle smoothly a stream of small data packets transmitted at the full wire speed of the network links, which can be in the tens of gigabits per second or even more. Generating packet traffic at this speed, however, typically requires dedicated, costly test equipment.

In place of a dedicated traffic generator of this sort, U.S. Patent Application Publication 2004/0095890 describes a switch with alternative operating modes, namely switching mode and traffic generation mode. The switch comprises a switch control module, a traffic generator control module, and a common platform. The switch control module is capable of receiving and forwarding packets, and the traffic generator control module is capable of generating instructions for traffic generation. A forwarding device receives packets from the switch control module, and forwards the packets to one or more network devices connected with one or more communication ports via a media access controlling device. A traffic generation device is capable of generating corresponding packets according to the instructions generated by the traffic generator control module, and forwards the packets to one or more of the communication ports via the media access controlling device.

As another example, U.S. Pat. No. 7,751,421 describes a switch in a data communications network for performing traffic generation in addition to standard switching and routing operations. The switch uses a fixed number of test packets retained in a conventional switch buffer to produce one or more infinite packet streams transmitted to a router under test (RUT). The switching device enqueues packets in the priority queues, dequeues the packets from the priority queues, transmits the dequeued packets to the RUT, and re-enqueues a copy of the dequeued packets into the priority queues from which they were dequeued. The enqueued packets and associated pointers to packets are organized into linked lists. By re-writing a copy of each dequeued packet to the tail of a linked list and updating the pointers, the switch produces repeatable streams of test packets. The priority buffers, without the re-write operation, may also be used for conventional egress traffic.

SUMMARY

Embodiments of the present invention that are described hereinbelow provide switching apparatus that can efficiently generate large numbers of copies of a packet and methods for network testing using such apparatus.

There is therefore provided, in accordance with an embodiment of the invention, communication apparatus, including multiple interfaces configured to be connected to a packet data network so as to serve as both ingress and egress interfaces in receiving and forwarding of data packets from and to the network by the apparatus. A memory is coupled to the interfaces and configured as a buffer to contain packets received through the ingress interfaces while awaiting transmission to the network via respective ones of the egress interfaces. Packet processing logic is configured, upon receipt of a test packet through an ingress interface of the apparatus, to allocate a space in the buffer for storage of a single copy of the test packet, to replicate and transmit sequentially multiple copies of the stored copy of the test packet through a designated egress interface, to receive an indication of a number of copies of the test packet that are to be transmitted, and responsively to the indication, to terminate replication of the test packet and release the allocated space in the buffer.

In some embodiments, the packet processing logic is configured, while transmitting the copies of the test packet through the designated egress interface, to continue receiving and forwarding the data packets from the network via the egress interfaces other than the designated egress interface.

Additionally or alternatively, the packet processing logic is configured upon receipt of a multicast packet through one of the ingress interfaces, to identify the egress interfaces through which respective copies of the multicast packet are to be transmitted, and to replicate and transmit multiple copies of the multicast packet through the egress interfaces using a replication mechanism that is also used in transmitting the copies of the test packet. In a disclosed embodiment, the test packet includes a multicast header, and the packet processing logic is configured, in response to the multicast header, to replicate and transmit respective sequences of copies of the test packet through multiple different egress interfaces concurrently.

In one embodiment, the apparatus includes a controller, which is configured to generate the test packet and to convey the test packet to the ingress interface via a loopback from a transmit side of the ingress interface.

In some embodiments, the packet processing logic includes multiple packet transmission units, which are coupled respectively to the interfaces and are configured to read the stored copy of the test packet from the buffer and replicate the copies of the test packet for transmission through the egress interfaces, and the packet processing logic is configured to generate descriptors indicative respectively of the copies of the test packets that are to be transmitted through the designated egress interface and to queue the descriptors for execution by a packet transmission unit of the designated egress interface. Typically, the descriptors are further indicative of modifications to be applied to the copies of the test packet that are transmitted, and the packet transmission unit is configured to apply the modifications, responsively to the descriptors, so that a value of a designated field varies over a sequence of the copies of the test packet. The value that varies can be selected from a group of values consisting of a time stamp, a sequential number, and a random number.

In a disclosed embodiment, the interfaces are configured to trap incoming test packets from the network, and to pass a subset of the trapped text packets to a monitoring agent.

There is also provided, in accordance with an embodiment of the invention, a method for communication, which includes receiving a test packet from a packet data network through an ingress interface of a switching element, which has multiple interfaces configured to be connected to a packet data network so as to serve as both ingress and egress interfaces in receiving and forwarding of data packets from and to the network. A space is allocated in a buffer in the switching element for storing a single copy of the test packet. Multiple copies of the stored copy of the test packet are replicated and transmitted sequentially through a designated egress interface of the switching element. An indication is received of a number of copies of the test packet that are to be transmitted, and responsively to the indication, replication of the test packet is terminated, and the allocated space in the buffer is released.

The present invention will be more fully understood from the following detailed description of the embodiments thereof, taken together with the drawings in which:

DETAILED DESCRIPTION OF EMBODIMENTS

Figure 1:
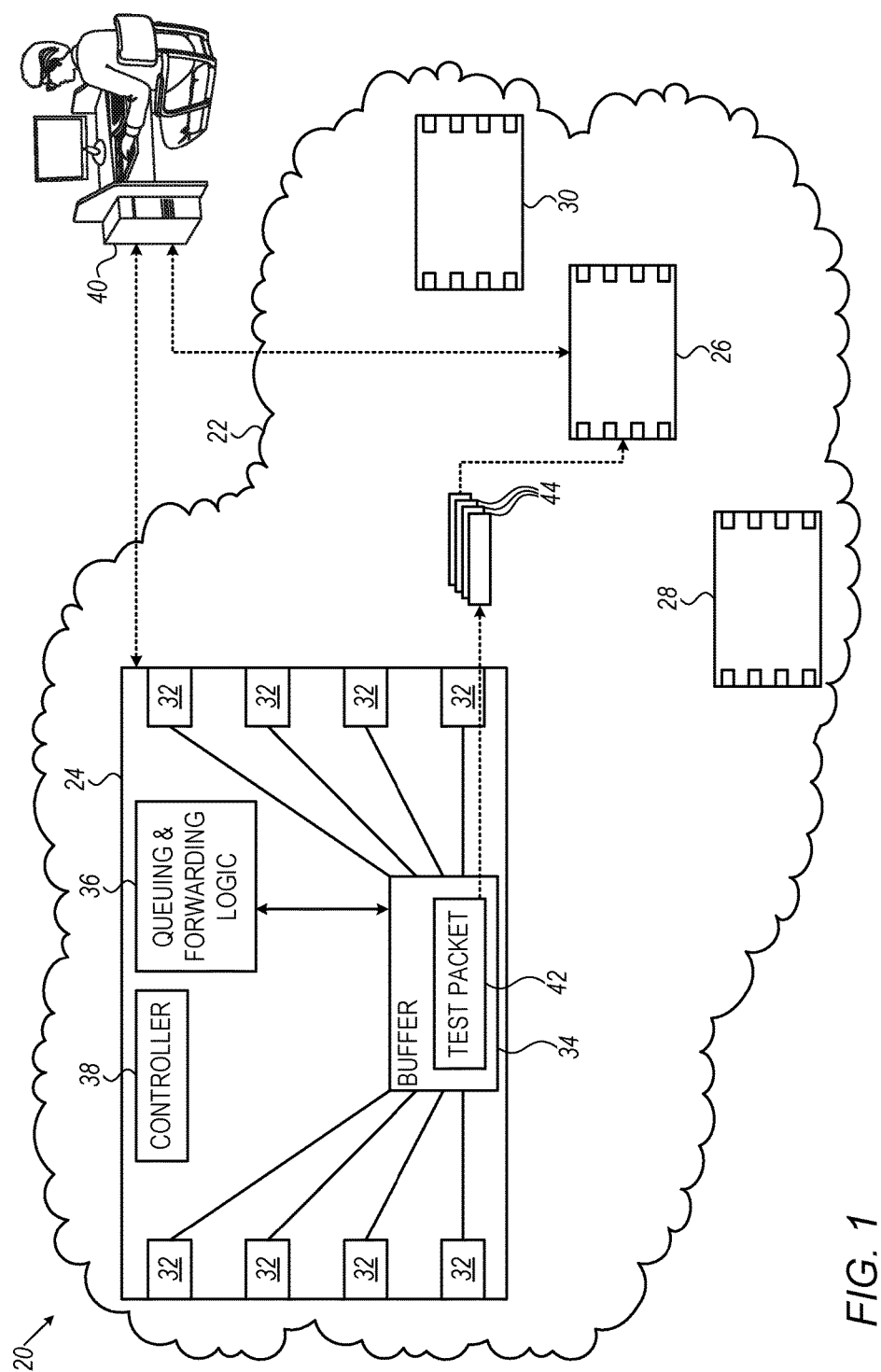
FIG. 1 is a block diagram that schematically illustrates a network communication system, in accordance with an embodiment of the invention.

U.S. patent application Ser. No. 14/961,923, filed Dec. 8, 2015, which is assigned to the assignee of the present patent application and whose disclosure is incorporated herein by reference, describes memory-efficient techniques for handling of multicast packets in a switch. In the embodiments described in this patent application, buffer control logic in a switch allocates buffer space for only a single copy of each multicast packet (and no more than this single copy) even when multiple copies are to be forwarded through different egress interfaces. The buffer control logic keeps track of the number of copies of the packet that are to be transmitted, as well as the number of copies that actually have been transmitted, in order to track the need for buffer space and release the buffer space when all copies have been transmitted.

Embodiments of the present invention that are described herein leverage these packet buffering and duplication capabilities in enabling the switch to generate test traffic efficiently. The switch can thus be configured to serve as a test traffic generator, in addition to its normal packet forwarding functions, with only minor modifications and additions to existing switch hardware resources and functionality. Alternatively, however, the disclosed packet duplication techniques can be used exclusively for purposes of test traffic generation in a switch, while multicast forwarding is handled by other means. In either case, the test traffic can be generated in this manner at the full transmission speed of which the switch is capable, which can be matched to the wire speed of the network or to other test requirements.

The disclosed embodiments thus provide communication apparatus, for example in the form of a switching element, which has multiple interfaces connected to a packet data network and configured to serve as both ingress and egress interfaces to receive and forward data packets. A memory coupled to the interfaces serves as a buffer, containing packets received through the ingress interfaces while the packets await transmission to the network via respective egress interfaces. Test generation is initiated when the switching element receives a test packet through a given ingress interface. Packet processing logic in the switching element allocates a space in the buffer for storage of a single copy of the test packet, and then replicates and transmits sequentially multiple copies of this stored copy through a designated egress interface. In the meanwhile, the switching element is able to continue receiving and forwarding data packets from the network via the egress interfaces other than the designated egress interface Generation of the test traffic continues until the packet processing logic has transmitted a specified number of test packets (or equivalently, has transmitted a specified volume of data or for a specified length of time). The packet processing logic receives an indication of the number of copies of the test packet that are to be transmitted, for example in the form of an initial count value that tells how many copies to generate, or a count signal indicating that a sufficient number of copies has been transmitted. In response to this indication, the packet processing logic terminates replication of the test packet when the test has been completed, and releases the allocated space in the buffer.

As noted earlier, the packet replication mechanism can also be used in replicating and transmitting multiple copies of multicast packets. Furthermore, when the test packet itself has a multicast header (or some other header calling for transmission of the packet through multiple egress interfaces), the packet processing logic can replicate and transmit respective sequences of copies of the test packet through multiple different egress interfaces concurrently.

In the disclosed embodiments, the packet processing logic comprises packet transmission units, which read the stored copy of the test packet from the buffer and replicate the copies of the test packet for transmission through respective egress interfaces. To invoke the operation of these packet transmission units—and hence generation of the sequence of test packets—the packet processing logic generates and queues descriptors corresponding to and indicative of the respective copies of the test packets that are to be transmitted. The packet transmission units read and execute the descriptors and thus generate the required copies of the test packets. The descriptors may also indicate modifications to be applied by the packet transmission units to the copies of the test packet that they transmit, so that the value of a designated field, for example, varies over a sequence of the copies of the test packet. This variable value may comprise, for example, a time stamp, a sequential number, or a random number.

On the receive side of the test traffic, the capabilities of the ingress interfaces of the receiving switch are also exploited. For example, the ingress interface that is to receive the test traffic may be configured to count and/or trap the incoming test packets from the network, and to pass a subset of the trapped text packets to a monitoring agent in the switch.

FIG. 1 is a block diagram that schematically illustrates a network communication system 20, in accordance with an embodiment of the invention. System 20 is built around a high-speed packet communication network 22, such as an Ethernet or InfiniBand network, comprising multiple, interconnected switches 24, 26, 28, 30, . . . . Switch 24, along with switches 26, 28 and 30, is shown here as an example of a type of apparatus in which the principles of the present invention may be implemented, which may generally include substantially any suitable sort of switching elements that are known in the art, such as bridges or routers. For the sake of simplicity, only switch 24 is shown here in detail. The other switches 26, 28, 30, . . . , are typically similar in structure and functionality. Alternatively, only a single switch or a small number of switches in network 22 may be configured with the sort of test packet generation capability that is described herein.

Switch 24 comprises multiple ports 32, connected by respective links in network 22 to corresponding ports of other switches. (Although only eight ports 32 are shown in FIG. 1 for the sake of simplicity, in practice switch 24 may typically have a substantially larger number of ports, or possibly fewer ports.) Ports 32 serve as ingress and egress interfaces in receiving and forwarding of data packets from and to other switches and hosts (not shown) in the network. A memory 34 is coupled to ports 32 and configured as a buffer to contain packets received through the ingress interfaces while the packets await transmission to the network via respective egress interfaces. Packet processing logic 36 assigns the packets to multiple queues for transmission to the network, and forwards the packets in their turn. An embedded controller 38 performs management functions, such as configuring port addresses and forwarding paths and monitoring network performance, under the control of software or firmware.

In the pictured scenario, a system operator initiates and evaluates the results of network tests using a management station 40, which communicates with switches 24, 26, 28, 30, . . . , by transmission of management packets over network 22 or, alternatively, over an out-of-band connection. To initiate a network test, for example, station 40 transmits a test packet 42 to switch 24, or possibly instructs controller 38 to generate such a test packet. Logic 36 allocates buffer space in memory 34 and stores a single copy of test packet 42 in this buffer. Logic 36 then replicates and transmits sequentially multiple copies 44 of the stored copy of test packet 42 through the port 32 that is designated in the test plan as the egress interface. In the pictured example, switch 26 receives the packet stream and reports the test results (such as the number, rate, and quality of arrival of the packets) back to management station 40.

Figure 2:
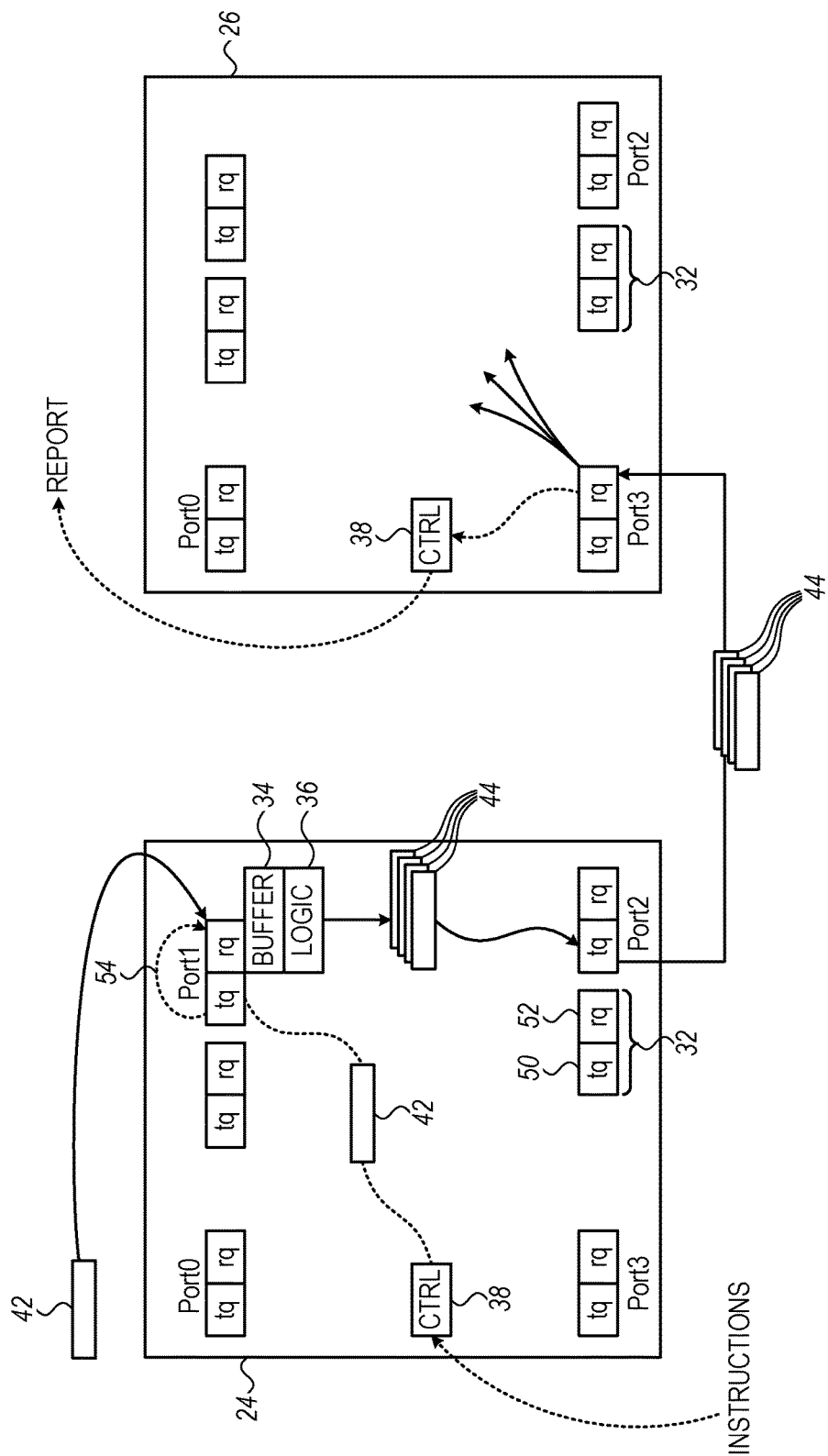
FIG. 2 is a block diagram that schematically illustrates functional elements of a pair of switches that respectively generate and receive test traffic over a packet data network, in accordance with an embodiment of the invention.

FIG. 2 is a block diagram that schematically illustrates functional elements of switches 24 and 26, showing details of implementation of the test scenario of FIG. 1, in accordance with an embodiment of the invention. Each port 32 is shown in this functional diagram as conceptually comprising a transmit queue (tq) 50 and a receive queue (rq) 52, although in fact these queues are held in memory 34 and managed by logic 36.

Under instructions from management station 40, for example, controller 38 generates a single copy of test packet 42 and conveys the test packet to one of ports 32, in this case the port labeled Port1, which serves as the ingress interface for the test packet. In order to create a buffer in memory 34 to hold and duplicate test packet 42, controller 38 passes the test packet to transmit queue 50 of Port1, with instructions (in the form of a suitable destination address, for example), to return the packet to receive queue 52 of Port1 via a loopback 54 from the transmit side of the port. Alternatively, management station 40 may transmit the single copy of test packet 42 directly to receive queue 52 of Port1. Further alternatively, management station 40 may transmit test packet 42 to another port 32, which passes the test packet to receive queue 52 of Port1.

In any case, upon receiving test packet 42 in receive queue 52 of Port1, logic 36 allocates space in the shared buffer in memory 34 for storage of a single copy of the test packet. Controller 38 designates the egress port for this packet—labeled Port2 in the present example—by suitable configuration of the entry corresponding to the destination address of test packet 42 in a forwarding table used by logic 36. Logic 36 queues, replicates, and transmits multiple copies 44 of test packet 42 through Port2, while maintaining a count of the replicated copies that have been transmitted.

This same mechanism is used, with minor changes, in transmitting and keeping track of multiple copies of multicast packets, although in this case, the copies are transmitted through multiple different egress ports. The multicast and test packet generation mechanisms can be used together, as noted earlier, in order to cause logic 36 to replicate and transmit respective sequences of copies 44 of test packet 42 through multiple different egress ports concurrently. For this purpose, test packet 42 typically has a multicast header.

When the count of transmitted packet copies 44 reaches a certain number, logic 36 terminates replication of test packet 42 and release the allocated buffer space in memory 34 so that it can be used for further incoming packets. Logic 36 receives an indication, from controller 38 or from station 40, for example, of the number of copies that are to be transmitted, and uses this indication in decided when to terminate the replication of test packets. The indication may simply be in the form of an integer corresponding to the desired number of copies, from which logic 36 counts down to zero. Alternatively, the count register that is used by logic 36 in deciding how many copies to make of a given packet (such as how many multicast copies) may be held at a default value, such as zero, during the test, which causes logic 36 to continue making copies 44 of test packet 42 in an endless loop. When it is time to terminate the test, controller 38 provides an indication to logic 36 that a sufficient number of packets have been transmitted by setting the count register to a positive value. Logic 36 will count down from this value to zero, and will then terminate the replication.

Typically, as noted earlier, Port2 transmits packet copies 44 to the designated port of switch 26 (labeled Port3 in the present example) at the full wire speed of the network link between the ports. Alternatively, ports 32 may comprise shaping logic (not shown), which allows them to control the rate at which they transmit data, and which may be used in varying the rate of transmission of packet copies 44.

On the receive side, controller 38 sets Port3 in switch 26 to count the number of copies 44 or the volume of data that it receives during the text, and to report this information periodically to controller 38. Monitoring agent software running on controller 38 digests and reports the results to management station 40. Additionally or alternatively, controller 38 instructs Port3 trap incoming test packets from the network, and to pass a subset of the trapped text packets to the controller for analysis by the monitoring agent software. Both of these counting and trapping functions are typically used, as well, by ports 32 and controller 38 for general management and control purposes (for example, in trapping management packets transmitted over network 22 from station 40 to controller 38). Controller 38 simply configures the settings of these functions appropriately for purposes of test reporting.

Figure 3:
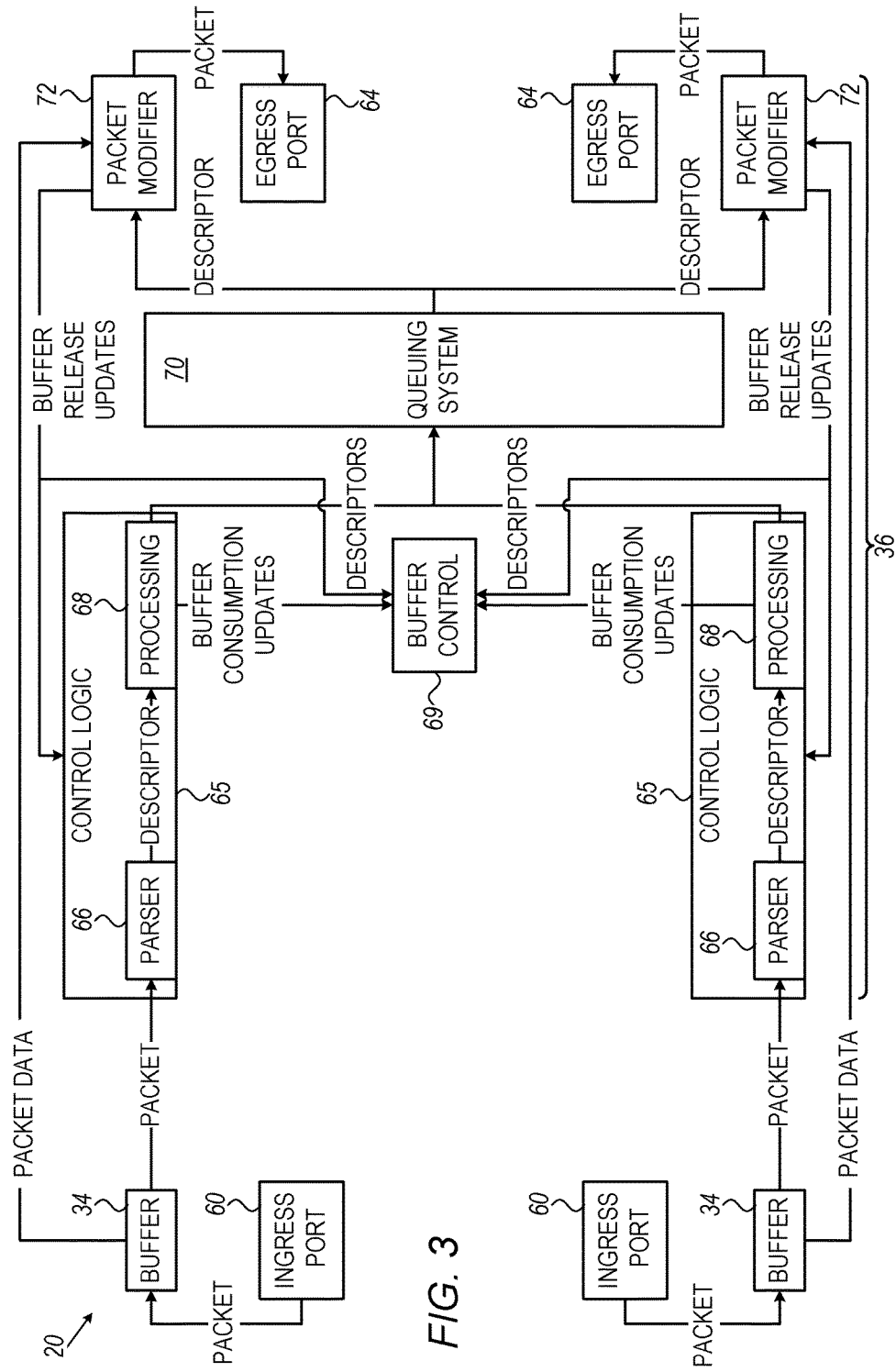
FIG. 3 is a block diagram that schematically shows details of packet processing logic in a switch, in accordance with an embodiment of the invention.

FIG. 3 is a block diagram that schematically shows details of packet processing logic 36 in switch 20, in accordance with an embodiment of the invention. The elements and functions of logic 36 that are shown in FIG. 3 are designed for handling normal network traffic (unicast and multicast), as well as generating test packet copies. This logic 36 can continue receiving and forwarding data packets from network 22 during test packet generation, via the ports that are not involved in the current test. For the sake of clarity and concreteness, FIG. 3 shows one possible implementation of logic 36, but other implementations will be apparent to those skilled in the art after reading the present description and are considered to be within the scope of the present invention. Although the elements of logic 36 are shown in FIG. 3 as separate functional components, in practice these components can be implemented together in custom or programmable hardware logic within a single chip or chip set.

Upon receiving an incoming packet, an ingress port 60 (such as one of ports 32 in FIG. 1) places the packet in a buffer in memory 34 and notifies decision control logic 65 that the packet is ready for processing. A parser 66 parses the packet header and generates one or more descriptors, which are passes to a descriptor processor 68 for further handling and generation of forwarding instructions. Based on the descriptors, for example, processor 68 typically determines an egress port 64 through which the packet is to be transmitted. The descriptor may also indicate the quality of service (QoS) to be applied to the packet, i.e., the level of priority for transmission, and any applicable instructions for modification of the packet header. For test packets, processor 68 typically generates multiple descriptors, one for each packet copy 44 that is to be transmitted in the test. All of these descriptors may indicate the same egress port, or they may indicate two or more different egress ports for multicast tests.

Descriptor processor 68 places the descriptors in the appropriate transmit queue or queues in a queueing system 70, to await transmission via the designated egress ports 64. Typically, queuing system 70 contains a dedicated queue for each egress port 64 or multiple queues per egress port, one for each QoS level. In some implementations, queuing system 70 may generate the multiple copies of multicast packets, rather than or in addition to the operation of processor 68 in this regard.

In addition, processor 68 counts the descriptors that have been generated in order to ascertain how many copies 44 of test packet 42 are to be transmitted. For normal forwarding of unicast packets, the count value will typically be one, except for cases in which control logic 65 is programmed to perform special replications of the packet, such as mirroring and trapping of packets for purposes of communication monitoring and diagnostics. For both test packet replication and multicast packets, however, processor 68 will count a higher number of descriptors. For multicast packets, this count corresponds to the number of different egress ports 64 through which copies of the packet are to be transmitted. For test packets, the count indicates the number of copies of the test packet that are to be transmitted in executing the test protocol. Alternatively, as noted above, the count may be set initially to a default value, which causes processor 68 to continue generating and queuing descriptors in an endless loop until the processor receives an indication that the test should be terminated.

Processor 68 passes the descriptor count for each packet to buffer control logic 69, which serves as the central buffer management and accounting unit for memory 34. Buffer control logic 69 increments or decrements a corresponding counter to this value until the specified number of copies of the packet have been replicated and transmitted.

When a descriptor reaches the head of its queue, queuing system 70 passes the descriptor to a packet modifier 72 for execution. Packet modifiers 72 are respectively coupled to egress ports 64 and serve as packet transmission units. In response to the descriptor, packet modifier 72 reads and replicates a copy of the appropriate test packet data from memory 34, and makes whatever modifications are called for in the packet header for transmission to network 22 through egress port 64. In some tests, controller 38 instructs control logic 65 to generate the descriptors so that the value of a designated field in test packet copies 44 will vary over the sequence of the copies. For example, the descriptors may instruct packet modifier 72 to insert a time stamp, a sequential number (either increasing or decreasing), a random number, or some other value read from a register in switch 24.

Upon the transmission of each packet copy through the corresponding egress port 64, packet modifier 72 signals buffer control logic 69 (and may also signal decision and control logic 65, as indicated in the figure). Logic 69 decrements the copy count in response to each received signal of this sort. When the count reaches zero—meaning that the last copy of the packet has been transmitted—buffer control logic 69 releases the buffer holding test packet 42, so that its location in memory 34 can be overwritten. This memory accounting and management process typically takes place for multiple different packets in parallel at any given time.

Figure 4:
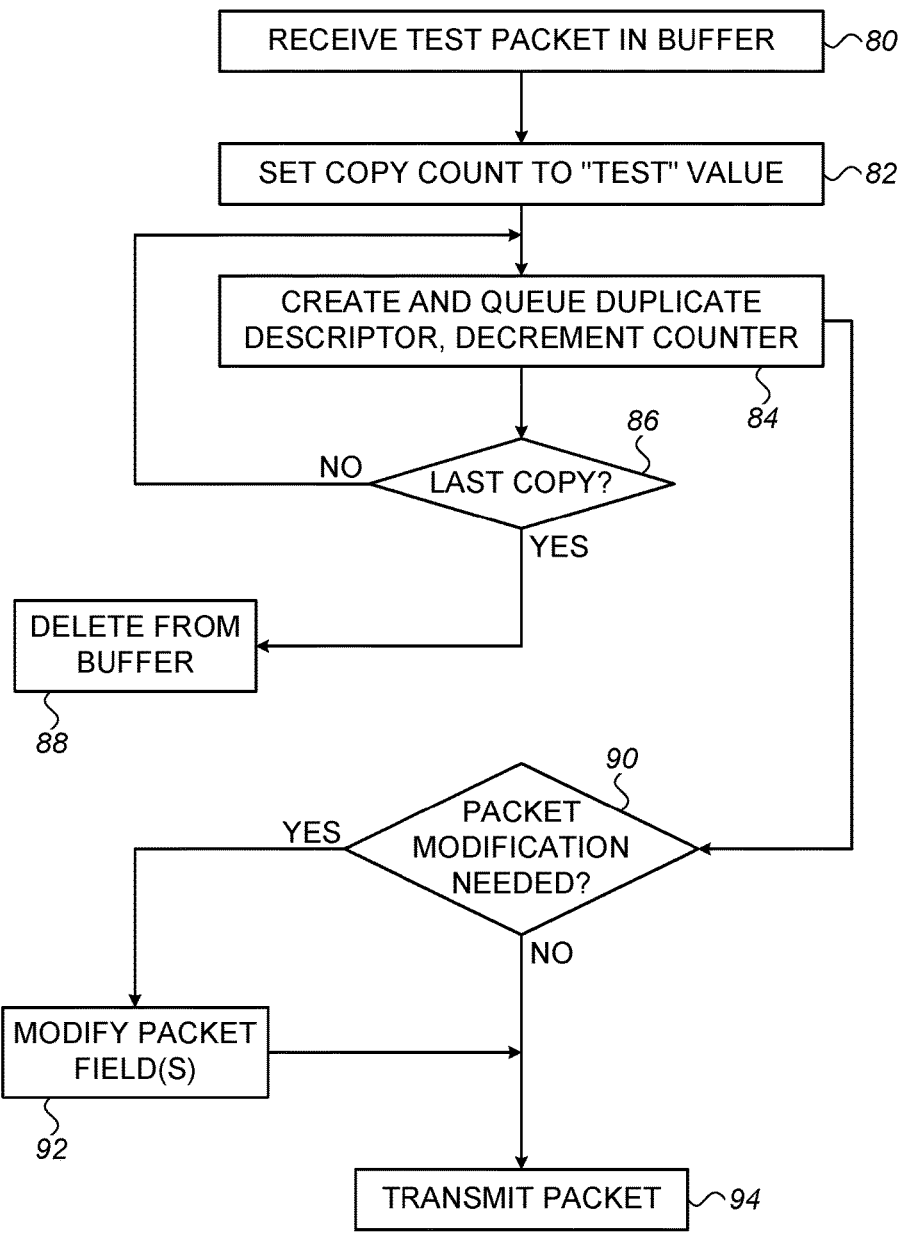
FIG. 4 is a flow chart that schematically illustrates a method for generation of test traffic in a switch, in accordance with an embodiment of the invention.

FIG. 4 is a flow chart that schematically illustrates a method for generation of test traffic in switch 24, in accordance with an embodiment of the invention. This figure summarizes the stages in the process of test packet replication that are described above.

The method is initiated when switch 24 receives test packet 42 in a buffer space that is allocated for this purpose in memory 34, at a packet reception step 80. Logic 36 sets the copy count for this test packet to the "test" value, at a counter setting step 82. The test value, as noted earlier, may correspond to the actual number of test packet copies 44 that are to get generated, or it may be a default value, such as zero. Logic 36 then proceeds to create and queue multiple, replicated descriptors corresponding to the desired test packet copies at a descriptor creation step 84. For each descriptor created, logic 36 decrements the counter value. Logic 36 checks whether the last packet copy has been queued and transmitted, at a completion checking step 86. If so, replication terminates, and test packet 42 is deleted from memory 34, at a buffer deletion step 88.

As each descriptor reaches the head of the transmit queue, logic 36 checks the descriptor to determine whether any modifications are called for in the packet header fields, at a modification checking step 90. If so, logic makes the necessary modification, at a packet modification step 92. Each packet copy 44 is then transmitted out to its destination, at a packet transmission step 94.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A communication apparatus, comprising:
    multiple interfaces configured to be connected to a packet data network so as to serve as both ingress and egress interfaces in receiving and forwarding of data packets from and to the network by the apparatus;
    a memory coupled to the interfaces and configured as a buffer to contain packets received through the ingress interfaces while awaiting transmission to the network via respective ones of the egress interfaces; and
    packet processing logic, which is configured, upon receipt of a test packet through an ingress interface of the apparatus, to allocate a space in the buffer for storage of a single copy of the test packet, to replicate and transmit sequentially multiple copies of the stored copy of the test packet through a designated egress interface, such that a plurality of the copies are transmitted through a single port, to receive an indication of a number of copies of the test packet that are to be transmitted, and responsively to the indication, to terminate replication of the test packet and release the allocated space in the buffer.

2. The apparatus according to claim 1, wherein the packet processing logic is configured, while transmitting the copies of the test packet through the designated egress interface, to continue receiving and forwarding the data packets from the network via the egress interfaces other than the designated egress interface.

3. The apparatus according to claim 1, wherein the packet processing logic is configured upon receipt of a multicast packet through one of the ingress interfaces, to identify the egress interfaces through which respective copies of the multicast packet are to be transmitted, and to replicate and transmit multiple copies of the multicast packet through the egress interfaces using a replication mechanism that is also used in transmitting the copies of the test packet.

4. The apparatus according to claim 3, wherein the test packet comprises a multicast header, and wherein the packet processing logic is configured, in response to the multicast header, to replicate and transmit respective sequences of copies of the test packet through multiple different egress interfaces concurrently.

5. The apparatus according to claim 1, and comprising a controller, which is configured to generate the test packet and to convey the test packet to the ingress interface via a loopback from a transmit side of the ingress interface.

6. The apparatus according to claim 1, wherein the packet processing logic comprises multiple packet transmission units, which are coupled respectively to the interfaces and are configured to read the stored copy of the test packet from the buffer and replicate the copies of the test packet for transmission through the egress interfaces, and wherein the packet processing logic is configured to generate descriptors indicative respectively of the copies of the test packets that are to be transmitted through the designated egress interface and to queue the descriptors for execution by a packet transmission unit of the designated egress interface.

7. The apparatus according to claim 6, wherein the descriptors are further indicative of modifications to be applied to the copies of the test packet that are transmitted, and wherein the packet transmission unit is configured to apply the modifications, responsively to the descriptors, so that a value of a designated field varies over a sequence of the copies of the test packet.

8. The apparatus according to claim 7, wherein the value that varies is selected from a group of values consisting of a time stamp, a sequential number, and a random number.

9. The apparatus according to claim 1, wherein the interfaces are configured to trap incoming test packets from the network, and to pass a subset of the trapped text packets to a monitoring agent.

10. A method for communication, comprising:
receiving a test packet from a packet data network through an ingress interface of a switching element, which has multiple interfaces configured to be connected to a packet data network so as to serve as both ingress and egress interfaces in receiving and forwarding of data packets from and to the network;

allocating a space in a buffer in the switching element for storing a single copy of the test packet;
replicating and transmitting sequentially multiple copies of the stored copy of the test packet through a designated egress interface of the switching element, such that a plurality of the copies are transmitted through a single port;
receiving an indication of a number of copies of the test packet that are to be transmitted; and
responsively to the indication, terminating replication of the test packet and releasing the allocated space in the buffer.

11. The method according to claim 10, and comprising, while transmitting the copies of the test packet through the designated egress interface, continuing in the switching element to receive and forward data packets from the network via the egress interfaces of the switching element other than the designated egress interface.

12. The method according to claim 10, and comprising, upon receipt of a multicast packet through one of the ingress interfaces, identifying the egress interfaces through which respective copies of the multicast packet are to be transmitted, and replicating and transmitting multiple copies of the multicast packet through the egress interfaces using a replication mechanism in the switching element that is also used in transmitting the copies of the test packet.

13. The method according to claim 12, wherein the test packet comprises a multicast header, and wherein replicating and transmitting the multiple copies of the multicast packet comprises replicating and transmitting, in response to the multicast header, respective sequences of copies of the test packet through multiple different egress interfaces concurrently.

14. The method according to claim 10, wherein receiving the test packet comprises generating the test packet in a controller of the switching element and conveying the test packet to the ingress interface via a loopback from a transmit side of the ingress interface.

15. The method according to claim 10, wherein the switching element comprises multiple packet transmission units, which are coupled respectively to the interfaces and are configured to read the stored copy of the test packet from the buffer and replicate the copies of the test packet for transmission through the egress interfaces, and wherein replicating and transmitting the multiple copies comprises generating, in the switching element, descriptors indicative respectively of the copies of the test packets that are to be transmitted through the designated egress interface, and queuing the descriptors for execution by a packet transmission unit of the designated egress interface.

16. The method according to claim 15, wherein the descriptors are further indicative of modifications to be applied to the copies of the test packet that are transmitted, and wherein generating the descriptors comprises specifying in the descriptors a value of a designated field that is to vary over a sequence of the copies of the test packet.

17. The method according to claim 16, wherein the value that varies is selected from a group of values consisting of a time stamp, a sequential number, and a random number.

18. The method according to claim 10, and comprising trapping, in the interfaces of a further switching element, incoming test packets from the network, and passing a subset of the trapped text packets to a monitoring agent.

* * * * *